(12) United States Patent
Cottrell et al.

(10) Patent No.: US 11,644,046 B2
(45) Date of Patent: May 9, 2023

(54) COMPOSITE FAN BLADES WITH INTEGRAL ATTACHMENT MECHANISM

(71) Applicant: Aurora Flight Sciences Corporation, Manassas, VA (US)

(72) Inventors: Daniel Cottrell, Manassas, VA (US); Randall Tatman, Manassas, VA (US); Steven Petullo, Bristow, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 227 days.

(21) Appl. No.: 15/863,210

(22) Filed: Jan. 5, 2018

(65) Prior Publication Data

US 2019/0211841 A1    Jul. 11, 2019

(51) Int. Cl.
*F04D 29/38*    (2006.01)
*F04D 29/32*    (2006.01)
(Continued)

(52) U.S. Cl.
CPC ............ *F04D 29/388* (2013.01); *B64C 11/16* (2013.01); *B64C 11/18* (2013.01); *B64C 11/24* (2013.01);
(Continued)

(58) Field of Classification Search
CPC ........ F04D 29/388; F04D 29/36; F04D 29/60; F04D 29/324; F04D 29/34; F04D 29/362; B64C 11/16; B64C 11/18; B64C 11/24; B64C 11/26; B64C 11/30; B64C 11/20; B64C 27/473; B64C 3/185; B64C 21/02; B64C 21/025; B64C 2027/829; B64C 29/0033; B64D 45/02; B29D 99/0028; B29D 99/0025; F01D 5/30; F01D 5/3023; F01D 5/147; F01D 5/18; F01D 5/187; F01D 5/282; F01D 1/065; F01D 1/0675; F03D 1/065; F03D 1/0675
(Continued)

(56) References Cited

U.S. PATENT DOCUMENTS 342,011 A    5/1886   Hoehle
1,786,644 A   12/1930  Davis
(Continued)

FOREIGN PATENT DOCUMENTS

EP    2287072 A2    2/2011
EP    2311726       4/2011
(Continued)

OTHER PUBLICATIONS

The partial European search report for Application No. 19150420.8, dated Apr. 17, 2019.
(Continued)

*Primary Examiner* — Woody A Lee, Jr.
*Assistant Examiner* — Justin A Pruitt
(74) *Attorney, Agent, or Firm* — Michael Stanley Tomsa; McAndrews, Held & Malloy, Ltd.; Amanda C. Jackson

(57) ABSTRACT

A fan blade comprising a blade body spanning from a blade root to a blade tip in a longitudinal direction and a fluid passageway formed within the blade body and extending from the blade root to the blade tip. The blade body spanning from a leading edge to a trailing edge in a lateral direction. The fluid passageway allowing fluid to flow out of the blade.

22 Claims, 17 Drawing Sheets

(51) Int. Cl.
| | |
|---|---|
| *B64C 11/24* | (2006.01) |
| *B64C 11/16* | (2006.01) |
| *B64C 11/18* | (2006.01) |
| *B64C 11/26* | (2006.01) |
| *F04D 29/36* | (2006.01) |
| *F04D 29/16* | (2006.01) |
| *F04D 29/52* | (2006.01) |
| *B64C 11/30* | (2006.01) |
| *B64D 45/02* | (2006.01) |
| *B64C 29/00* | (2006.01) |

(52) U.S. Cl.
CPC .............. *B64C 11/26* (2013.01); *B64C 11/30* (2013.01); *B64D 45/02* (2013.01); *F04D 29/324* (2013.01); *F04D 29/36* (2013.01); *B64C 29/0033* (2013.01); *F04D 29/164* (2013.01); *F04D 29/522* (2013.01)

(58) Field of Classification Search
USPC .......................................................... 416/92
See application file for complete search history.

(56) References Cited

U.S. PATENT DOCUMENTS

| | | | | |
|---|---|---|---|---|
| 1,972,485 | A * | 9/1934 | Hoover | B64C 11/06 416/157 R |
| 2,637,405 | A * | 5/1953 | Stanley | B64C 27/473 244/134 R |
| 2,938,585 | A | 5/1960 | Fanti | |
| 2,942,672 | A | 6/1960 | Serriades | |
| 3,055,437 | A * | 9/1962 | Stack | B64C 27/473 416/226 |
| 3,128,829 | A | 4/1964 | Young | |
| 3,385,374 | A | 5/1968 | Kaplan et al. | |
| 3,647,317 | A * | 3/1972 | Furlong | B64C 27/473 416/226 |
| 3,903,578 | A | 9/1975 | Rothman | |
| 3,923,421 | A * | 12/1975 | Carter | B64C 27/46 416/224 |
| 4,302,155 | A * | 11/1981 | Grimes | B64C 11/26 416/144 |
| 4,524,499 | A * | 6/1985 | Grimes | B64C 11/26 29/450 |
| 4,626,172 | A * | 12/1986 | Mouille | B29D 99/0025 416/134 A |
| 4,642,028 | A | 2/1987 | Buckman et al. | |
| 4,648,921 | A * | 3/1987 | Nutter, Jr. | B29C 70/08 156/242 |
| 4,802,822 | A | 2/1989 | Gilgenbach et al. | |
| 4,836,748 | A | 6/1989 | Church | |
| 5,104,292 | A | 4/1992 | Koepsel et al. | |
| 5,114,313 | A | 5/1992 | Vorus | |
| 5,240,377 | A | 8/1993 | Farr | |
| 5,253,824 | A * | 10/1993 | Halila | F01D 5/147 244/123.14 |
| 5,464,321 | A | 11/1995 | Williams et al. | |
| 5,720,597 | A * | 2/1998 | Wang | F01D 5/147 416/229 A |
| 5,725,355 | A * | 3/1998 | Crall | F01D 5/147 416/229 A |
| 5,727,381 | A | 3/1998 | Rogers | |
| 5,863,181 | A * | 1/1999 | Bost | B64C 11/205 416/224 |
| 6,676,080 | B2 * | 1/2004 | Violette | B64C 11/04 244/123.1 |
| 7,494,324 | B2 * | 2/2009 | Hibbard | H02G 13/00 416/230 |
| 7,637,722 | B1 | 12/2009 | Koepsel et al. | |
| 8,075,274 | B2 | 12/2011 | Carvalho | |
| 9,045,986 | B2 * | 6/2015 | Bianchi | B29D 99/0028 |
| 9,168,999 | B2 * | 10/2015 | Nagle | B64C 11/26 |
| 9,499,253 | B1 | 11/2016 | White | |
| 9,505,486 | B2 * | 11/2016 | Nagle | B64C 11/26 |
| 9,616,629 | B2 * | 4/2017 | Fabre | B29C 70/24 |
| 9,638,048 | B2 * | 5/2017 | Measom | B23P 15/04 |
| 9,702,255 | B2 | 7/2017 | Martin et al. | |
| 10,611,930 | B2 * | 4/2020 | Rezai | B32B 27/281 |
| 2002/0008177 | A1 * | 1/2002 | Violette | B64C 11/04 244/123.1 |
| 2006/0254661 | A1 * | 11/2006 | Vintilescu | F01D 25/243 138/97 |
| 2007/0041842 | A1 * | 2/2007 | Thompson | F01D 5/147 416/223 R |
| 2010/0215499 | A1 * | 8/2010 | Lafont | F02K 3/025 416/204 A |
| 2011/0044796 | A1 * | 2/2011 | Hussain | B64C 23/065 415/115 |
| 2013/0045107 | A1 | 2/2013 | Topaz et al. | |
| 2013/0108442 | A1 * | 5/2013 | Rosati | F04D 29/36 416/1 |
| 2014/0069077 | A1 * | 3/2014 | Murdock | F04D 29/324 60/39.091 |
| 2016/0009373 | A1 * | 1/2016 | Kondor | B64C 11/06 416/149 |
| 2017/0023008 | A1 * | 1/2017 | Roche | F01D 5/282 |
| 2017/0334548 | A1 * | 11/2017 | Foskey | B64C 11/26 |
| 2018/0057176 | A1 * | 3/2018 | Kinlen | H05B 3/145 |
| 2018/0127088 | A1 * | 5/2018 | Amat | B32B 5/18 |
| 2018/0297692 | A1 * | 10/2018 | Sargent | B64C 21/04 |

FOREIGN PATENT DOCUMENTS

| | | |
|---|---|---|
| EP | 3290341 A1 | 7/2018 |
| WO | 92/14646 | 9/1992 |
| WO | 2017/123294 A1 | 7/2017 |

OTHER PUBLICATIONS

The extended European search report for Application No. 19150420.8, dated Jul. 24, 2019.

* cited by examiner

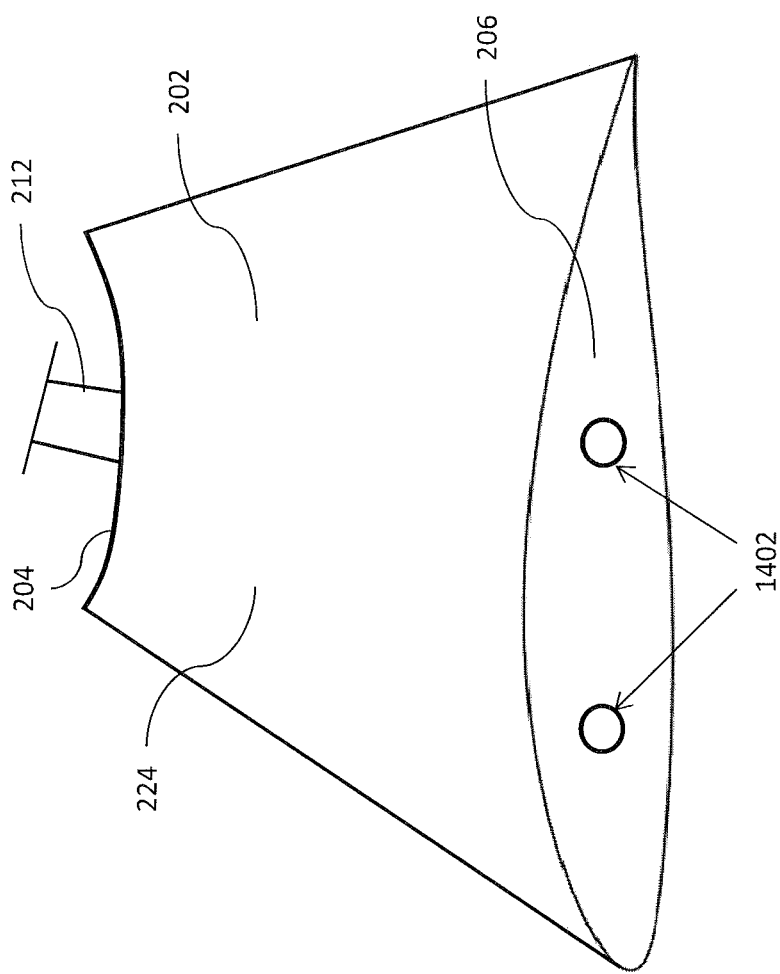

COMPOSITE FAN BLADES WITH INTEGRAL ATTACHMENT MECHANISM

STATEMENT OF GOVERNMENT INTEREST

This invention was made with government support under Contract Number: HR0011-14-C-0014 awarded by the Defense Advanced Research Projects Agency (DARPA). The government has certain rights in the invention.

TECHNICAL FIELD

The present disclosure relates to blades for a fan and/or propeller, and particularly to a method for creating a light weight, high integrity, and increased safety fan blade with an integral attachment mechanism.

BACKGROUND

The appendages of a fan and/or propeller that radially extend from the hub are sometimes referred to as blades. The blades perform much of the work of the fan and/or propeller. Fan and/or propeller blades convert mechanical drive power from a motor or engine into thrust, such as to propel a vessel through a fluid (e.g., such as water, air, etc.), and/or to propel the fluid itself, such as for cooling purposes and/or for other operational purposes. Traditionally, the blades are connected to a hub that drives, or is itself driven to provide, movement of the blades.

SUMMARY

The present disclosure relates to blades for a fan and/or propeller, and particularly to a method for creating a light weight, high integrity, and increased safety fan blade with an integral attachment mechanism.

According to a first aspect, a fan blade comprises: a blade body spanning from a blade root to a blade tip in a longitudinal direction, and spanning from a leading edge to a trailing edge in a lateral direction; and a fluid passageway formed within the blade body to allow fluid to flow out of the blade body, wherein the fluid passageway extends from the blade root to the blade tip.

In certain aspects, the fan blade further comprises a scoop to urge fluid through the fluid passageway.

In certain aspects, the blade tip includes an aperture, and wherein the fan blade is configured to direct fluid from the fluid passageway through the aperture.

In certain aspects, the blade body comprises an upper portion and a lower portion, and wherein the upper portion is bonded to the lower portion using a structural adhesive.

In certain aspects, the fluid passageway extends through the structural adhesive.

In certain aspects, the structural adhesive extends from the leading edge to the trailing edge to act as a structural member.

In certain aspects, the blade body comprises an upper portion and a lower portion, and wherein the upper portion is electrically connected to the lower portion via a conductive bonding material to provide an electrical pathway for static dissipation to an electrical ground.

In certain aspects, the conductive bonding material is a conductive silver epoxy.

In certain aspects, the fan blade further includes a fluid guide configured to guide fluid through the fluid passageway.

According to a second aspect, a fan comprises: a bearing assembly; a collar attached to the bearing assembly; and a fan blade attached to the collar, wherein the fan blade includes a blade body having a spar extending therethrough, and wherein the spar is bonded to the collar with a fixative substance.

In certain aspects, the collar includes a tapering neck defining a bore, wherein the tapering spar is positioned within the bore and bonded to the neck.

In certain aspects, the hub is configured to rotate around an axis.

In certain aspects, the collar includes a bearing.

In certain aspects, the collar includes a pivot bearing configured to pivot about a spar axis.

In certain aspects, the fan blade body spans from a root to a tip in a longitudinal direction, wherein the spar extends through the body from the root to a termination point short of the tip.

In certain aspects, the blade body comprises an upper portion and a lower portion, and wherein the upper portion is electrically connected to the lower portion via a conductive bonding material to provide an electrical pathway for static dissipation to an electrical ground.

In certain aspects, the conductive bonding material is positioned adjacent to the termination point of the spar.

In certain aspects, the conductive bonding material is a conductive silver epoxy.

In certain aspects, the fan blade body spans from a root to a tip in a longitudinal direction, and wherein the fan blade body includes a fluid passageway extending from the root to the tip, wherein the fluid passageway allows fluid to flow out of the blade body.

In certain aspects, the fan blade further comprises a scoop to urge fluid through the fluid passageway.

In certain aspects, the tip includes an aperture, and wherein the fan blade is configured to direct fluid from the fluid passageway through the aperture.

According to a third aspect, a fan blade comprises: an upper portion spanning from a blade root to a blade tip, wherein the upper portion defines a first outer surface and a first inner surface, wherein the first inner surface comprises a first trough; a lower portion spanning from the blade root to the blade tip, wherein the lower portion defines a second outer surface and a second inner surface, wherein the second inner surface comprises a second trough, wherein the upper and lower portions merge to define a blade body having a leading edge and a trailing edge, and wherein the first and second troughs align to define a cavity in the blade body; a spar extending between the upper and lower portions from the blade root towards the blade tip and terminating at a termination point prior to the blade tip, wherein the spar is positioned approximately equidistant from the leading edge and trailing edge, and wherein the spar is coated in a bonding material to bond the upper portion to the lower portion; and an adhesive support positioned between the upper portion and the lower portion and configured to at least partially bond the upper portion to the lower portion.

In certain aspects, the fan blade further comprises a rib having an upper edge and a lower edge, wherein bonding material is placed on the upper edge and the lower edge, and wherein the rib is positioned between the upper and lower portions such that the upper and lower portions are at least partially bonded together through the rib.

In certain aspects, the rib is positioned at the root.

In certain aspects, the rib is positioned in a trough defined by a portion of the aligned first and second troughs.

In certain aspects, the rib of the spar is positioned in the cavity defined by the first and second troughs.

In certain aspects, the adhesive support further extends along the wing tip from the leading edge to the trailing edge.

In certain aspects, the adhesive support includes an aperture.

In certain aspects, the aperture is aligned with a portion of the first or second troughs, thereby creating a passage for fluid to flow to provide a path for trapped air to exit the fan blade or blade body.

In certain aspects, the adhesive support includes a plurality of apertures, wherein each aperture is aligned with a portion of the first or second troughs.

In certain aspects, the passage extends from the wing root to the wing tip.

In certain aspects, the blade body further includes scoops to funnel air through the passage.

In certain aspects, the adhesive support comprises a mix of an adhesive and a thickening agent.

In certain aspects, the thickening agent includes glass microspheres.

In certain aspects, the fan blade further includes an electrically conductive connector to electrically connect the upper and lower portions to provide an electrical pathway for static dissipation.

In certain aspects, the electrically conductive connector comprises conductive epoxy In certain aspects, the first and second outer surfaces and the first and second inner surfaces are electrically conductive.

In certain aspects, the first and second inner surfaces comprise a composite material.

In certain aspects, the composite material is composed of one or more of carbon fiber, para-aramid synthetic fiber, and glass fiber.

In certain aspects, the electrically conductive connector is positioned between the spar and the structural adhesive.

According to a fourth aspect, a method of enhancing integrity of a fan blade having a blade body comprises the steps of: providing a first portion of the blade body; providing a second portion of the blade body; providing a spar between the first portion and the second portion, wherein the spar is coated with a bonding material; and bonding the first portion to the second portion with the spar positioned between the first portion and the second portion, wherein the bonding material bonds the first portion to the second portion to define the blade body.

In certain aspects, the method further comprises the step of providing an adhesive support between the first portion and the second portion, wherein the adhesive support bonds the first portion to the second portion.

In certain aspects, the method further comprises the step of providing a conductive bonding material between the first portion and the second portion, wherein the conductive bonding material bonds the first portion to the second portion and provides an electrical pathway for static dissipation.

In certain aspects, the method further comprises the step of forming a fluid passageway between the first portion and the second portion to allow fluid to flow out of the blade body.

In certain aspects, the method further comprises the step of providing a fluid guide to guide fluid through the fluid passageway.

DESCRIPTION OF THE DRAWINGS

The foregoing and other objects, features, and advantages of the devices, systems, and methods described herein will be readily understood from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

FIG. 3a illustrates a perspective view of the collar of the fan blade of FIG. 2a.

FIG. 3b illustrates a top plan view of the collar of FIG. 3a.

FIG. 6 illustrates a top plan view of an upper portion of the fan blade of FIG. 2a.

FIG. 7 illustrates a top plan view of a lower portion of the fan blade of FIG. 2a.

FIG. 14 illustrates a perspective view of a fan blade with apertures.

DETAILED DESCRIPTION

Figure 1:
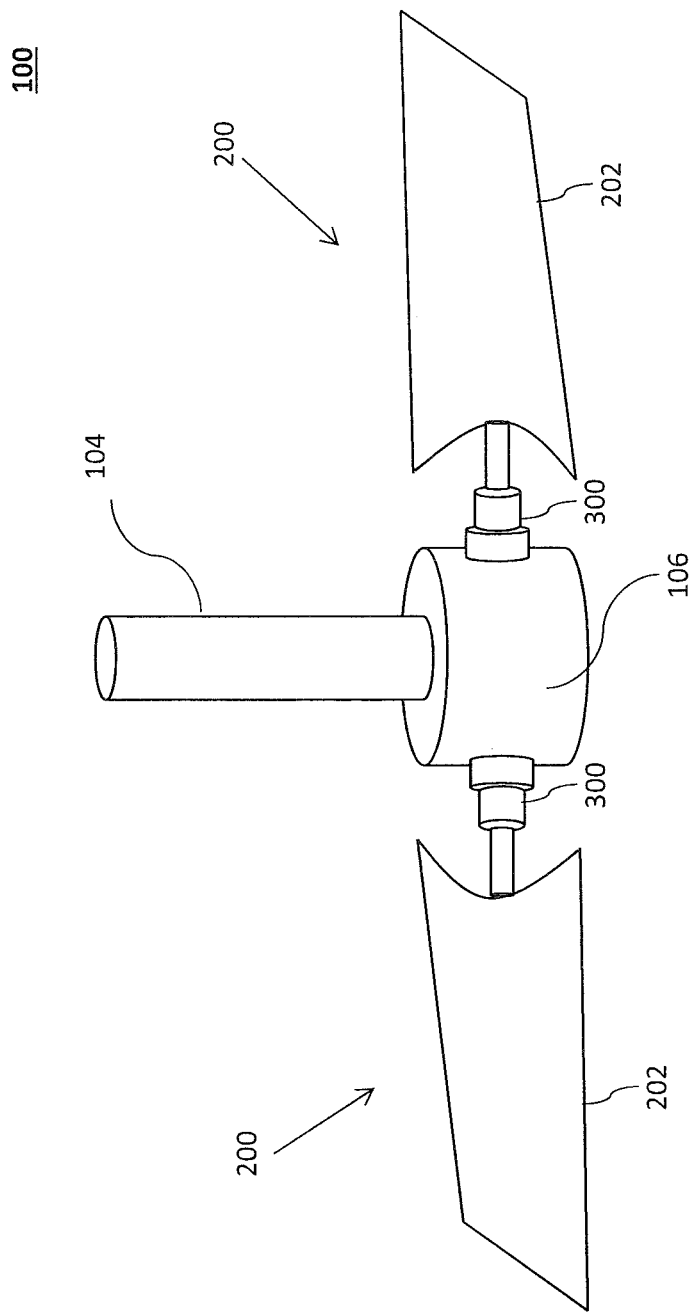
FIG. 1 illustrates a perspective view of a fan.

Preferred embodiments of the present disclosure will be described herein below with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this application, the following terms and definitions shall apply:

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The terms "about" and "approximately," when used to modify or describe a value (or range of values), mean reasonably close to that value or range of values. Thus, the embodiments described herein are not limited to only the recited values and ranges of values, but rather should include reasonably workable deviations.

The term "aircraft" refers to a machine capable of flight, including, but not limited to, BWB aircraft, traditional aircraft, unmanned aerial vehicles (UAVs), drones, blimps, dirigibles, personal aircrafts (e.g., jetpacks), and/or vertical take-off and landing (VTOL) aircraft, such as rotorcraft (e.g., helicopters) and/or tilt-rotor/tilt-wing aircraft.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix. In certain aspects, the composite material may comprise a para-aramid synthetic fiber (e.g., Kevlar, available from DuPont).

The terms "coupled," "coupled to," and "coupled with" as used herein, each mean a structural and/or electrical connection, whether attached, affixed, connected, joined, fastened, linked, and/or otherwise secured.

The term "exemplary" means serving as a non-limiting example, instance, or illustration. As utilized herein, the terms "e.g.," and "for example" set off lists of one or more non-limiting examples, instances, or illustrations.

The present disclosure is related to a fan and/or propeller blade having unique features that may lead to several advantages, such as, for instance, reduced weight in the fan blade and/or in associated parts and/or components. The disclosed fan blade may be used, for example, in a ducted fan, a shrouded fan, and/or an open fan. For example, the fan blade may be used in an aircraft propulsion system, such as part of a propeller, a ducted fan propulsion system, a VTOL propulsion system, a turbofan, a propfan, etc. In one aspect, the disclosed blades may be employed in an aircraft having a ducted fan propulsion system, an example of which is described in greater detail by commonly owned U.S. patent application Ser. No. 15/403,818 to Francesco Giannini et al., which was filed on Jan. 11, 2017 and is titled "Hybrid Propulsion Vertical Take-Off and Landing Aircraft." Alternatively, or additionally, the fan may be used in an industrial blower, and/or a heating, ventilation, and air conditioning (HVAC) system. The disclosed blades may additionally or alternatively be used as small aircraft and/or marine craft wings and/or canard wings. Therefore, while the disclosed blade may be generally described in terms of fan blades, the principles may be equally applicable to other airfoil and hydrofoil surfaces.

In an exemplary example, the disclosed blade may be composed of a composite material. The composite material may be electrically conductive. In some examples, both the interior and exterior of the blade are composed of composite materials. In some examples, the interior of the blade may be composed of a composite material, while the exterior of the blade may be composed of a different material, such as a metal, or non-conductive composite such as an aramid for instance. In certain aspects, the disclosed blade may be produced using, for example, one or more molds and a composite material pre-impregnated resin systems ("pre-preg" or "pre-preg material", i.e., composite fibers having uncured matrix material already present). As can be appreciated, the pre-impregnated material may require preparation before use to increase cure quality, such as sanding and cleaning (e.g., using isopropyl alcohol).

In an exemplary example, the blade may be composed of multiple pieces that are coupled together. For instance, the blade may be composed of an upper piece and a lower piece. The blade pieces may be coupled together using a bonding material (a fixative substance), such as an adhesive and/or glue for example. In some examples, the bonding material may be Hysol 9359.3. Additionally, or alternatively, the blade pieces may be electrically coupled using an electrically conductive connecting material, such as a silver epoxy, for example. In examples where portions of the interior of the blade are electrically conductive, rather than electrically insulated, the electrical coupling may provide a pathway for static electricity dissipation from any part of the blade back to a ground.

In an exemplary example, a spar may be used as a central support for the blade. The spar may extend from the root of the blade towards the tip of the blade. The spar may be positioned at an approximate longitudinal and/or lateral position as required. For example, the spar may be position along the lateral middle of the blade, approximately equidistant from a leading edge and a trailing edge of the blade. As will be appreciated, the spar may not traverse the entire blade span and may be of one or more segments of varying geometry (e.g., a circular spar to square member/box beam). Bonding material may be applied on and around the spar to assist in bonding the upper and lower portions of the blade together around the spar. In some embodiments, the bonding material may be electrically conductive.

A portion of the spar may be bonded to a hub and/or collar. The bonding may be through the use of a bonding material. In some examples, the adhesive may be an industrial adhesive and/or an electrically conductive adhesive. In some examples, the collar may be a pivot bearing used in a variable pitch mechanism and the spar may be bonded to one or more portions of the pitch mechanism (e.g., pitch arm clevis) that are integral to the pivot bearing. In such an example, the pivot bearing may be configured to rotate about an axis defined by the spar.

In one aspect of the disclosure, a microsphere mixed structural adhesive may be used as an additional support for the blade. The structural adhesive may be positioned in the center of the blade, near the spar. The structural adhesive may additionally and/or alternatively be placed along the tip edge of the blade. Pins may be placed in the structural adhesive before coupling the upper and lower portions of the blade together. Apertures (and/or holes, openings, etc.) may be created when the pins are removed after the upper and lower portions have been securely coupled together. The apertures may be aligned with recessed channels in the blade to create fluid passages that convey fluid (e.g., air, liquid, etc.) within the blade. The fluid passages may serve to alleviate structural deformation or failure due to trapped air (or liquid) that could otherwise create large centrifugal pressure forces on the interior of the blade. The fluid passages may also provide buffer air out the tip of the blade to more effectively close the tip gap between the blade and the wall of a duct when used in a ducted fan blade. In some examples, scoops may be used to funnel and/or force additional air through the fluid passages to further increase the effects of air out the tip in effectively reducing the fan blades tip gap in the duct.

FIG. 1 shows an example fan 100 having fan blades 200. The example fan 100 includes a central shaft 104 (e.g., drive shaft) defining an axis about which the fan blades 200 revolve (and/or rotate, turn, circle, orbit, travel, spin, move, etc.). The fan 100 comprises a plurality of fan blades 200. While two fan blades 200 are shown in the example, more or less fan blades 200 may be used as desired (e.g., 2 to 20). The central shaft 104 is coupled to a hub 106, which retains the fan blades 200 and rotates the blades around the central shaft 104. Each fan blade 200 is coupled to the hub 106 through a collar 300. The central shaft 104 and/or hub 106 may be coupled to a drive system to propel the movement of the fan 100.

While the example aspect disclosed in FIG. 1 shows the fan blades 200 in relation to a simple fan 100, this is only as an example to illustrate a possible use of the fan blades 200. Persons of ordinary skill will understand that the fan blades 200 may be used in different types of fans, and/or in a number of other systems, such as a propeller system, a ducted fan propulsion system, a VTOL propulsion system, a turbofan, a propfan, in an industrial blower, in an HVAC system, etc.

Figure 2B:
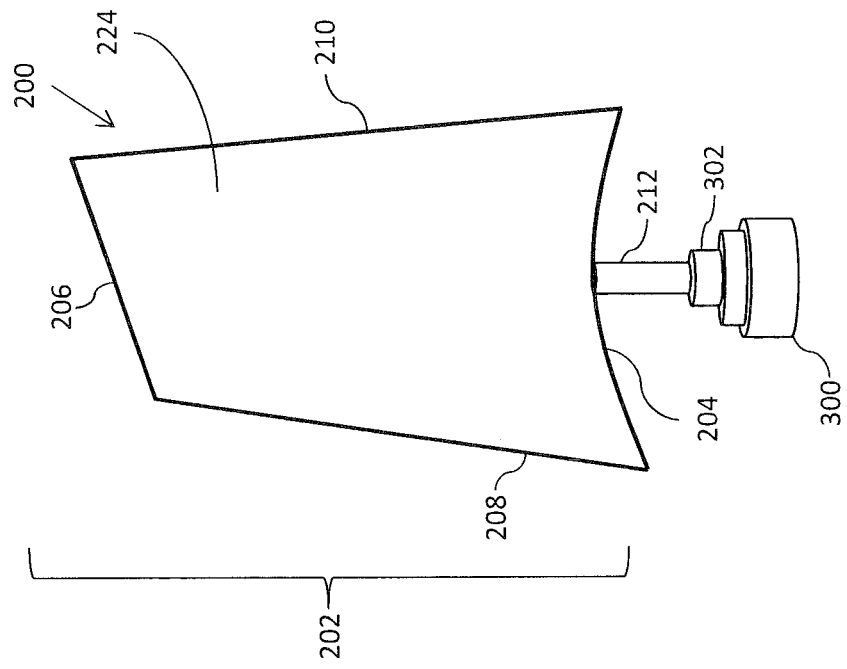
FIGS. 2a and 2b illustrate perspective view of the top and bottom sides of a fan blade, such as may be used in the fan of FIG. 1.
Figure 2A:
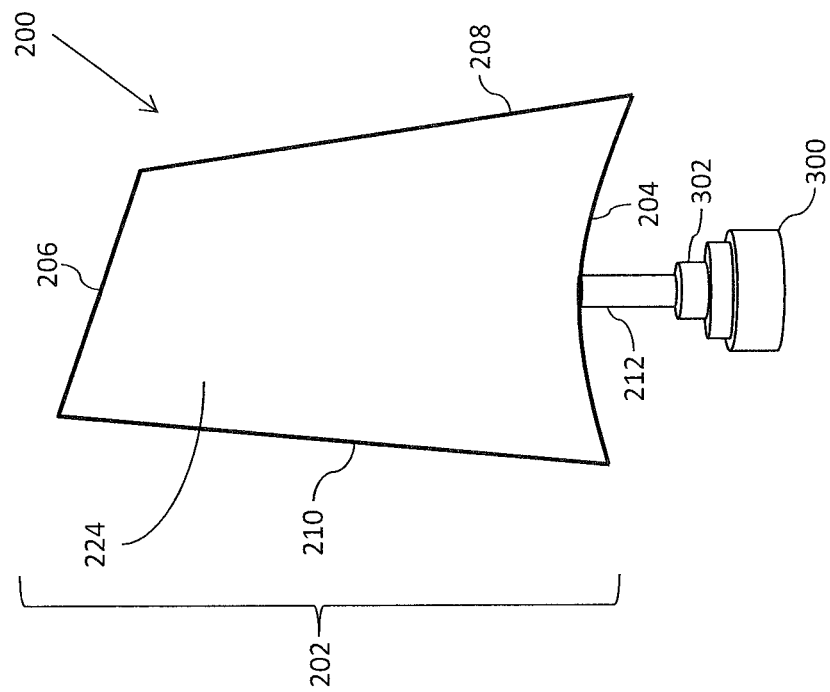

FIGS. 2a and 2b illustrate perspective view of the top and bottom sides of an example fan blade 200 according to an aspect of the disclosure. The fan blade 200 includes a main body 202 (a blade body). The main body 202 extends from a blade root 204 (proximal end) to a blade tip 206 (distal end) in a longitudinal direction. The main body 202 extends from a leading edge 208 to a trailing edge 210 in a lateral direction. A central spar 212 extends through the main body 202. For example, the spar 212 may extend through an approximate lateral middle of main body 202), which may be approximately equidistant from the leading edge 208 and trailing edge 210. In other examples, the spar 212 may extend through main body 202 closer to the leading edge 208 than the trailing edge 210, or closer to the trailing edge 210 than the leading edge 208. In some examples, the spar 212 may be closer to the leading edge 208 at some positions within the fan blade 200 and closer to the trailing edge 210 at other positions. The spar 212 protrudes from blade root 204 of the fan blade's 200 main body 202 and connects to the collar 300. The collar 300 includes a neck 302 that surrounds and secures to the spar 212. In an exemplary embodiment, the spar 212, which may be fabricated from a composite material, is bonded to the neck 302 of the collar 300 using a bonding material, such as an industrial adhesive, glue, and/or epoxy, for example. In some examples, the spar 212 provides a tapered fit to the collar 300 such that the spar 212 is mechanically constrained from sliding out from the collar 300.

Figure 3B:
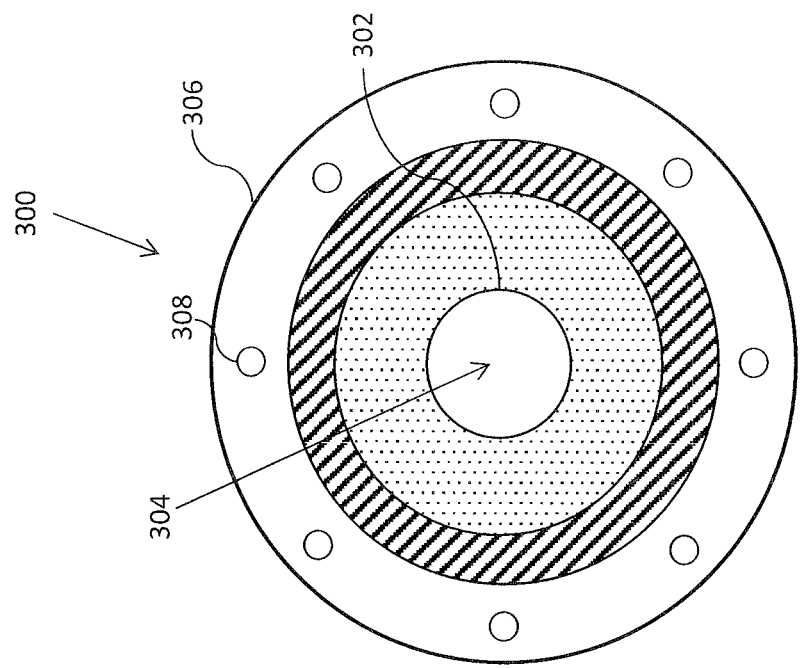
Figure 3A:
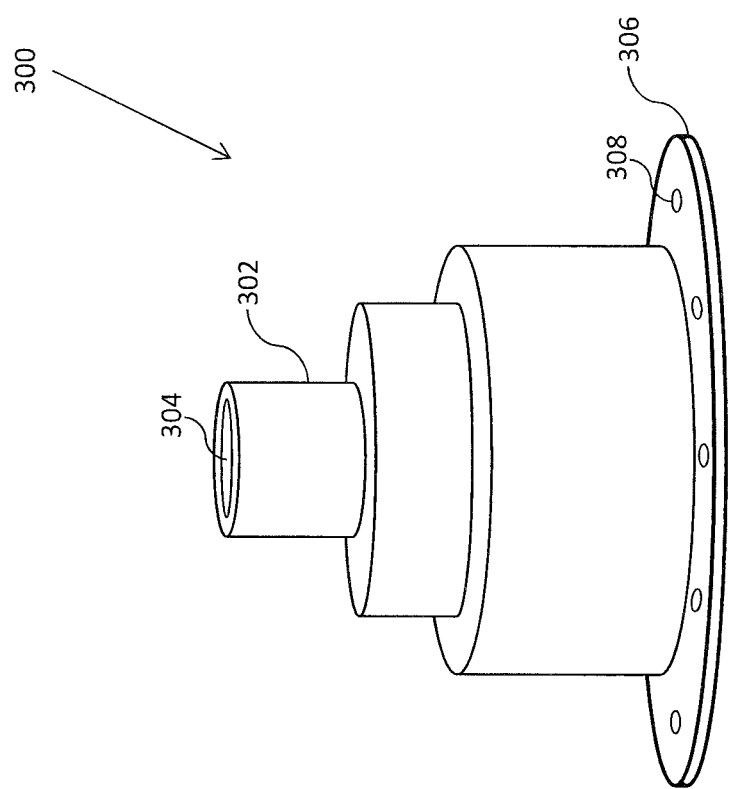

FIGS. 3a and 3b illustrate the collar 300 removed from the fan 100 and fan blades 200. As shown, the collar includes a neck 302 that defines (and/or encloses, surrounds etc.) a bore 304 that extends through the collar 300. The collar 300 may be secured to another device using the securing plate 306, which may be provided with a plurality of holes 308 to enable removably attachment via an attachment device (e.g., bolt, screw, rivet, fastener, etc.). Alternatively, the collar 300 may be permanently secured to another device through one or more welding or adhesion techniques. The collar 300 may be fabricated using a metal or metal alloy, such as aluminum, titanium, etc., and/or a composite material. When used in an aircraft, the collar 300 may be fabricated using one or more aircraft grade metal alloys, such as aluminum alloys 2024-T3, 6061-T6, 5052-H32, 3003-H14, 7075, etc. In some examples, the collar 300 may be inserted into an assembly, such as a bearing assembly. The bearing assembly may, for example, include an inner and outer race, one of which may have a flange for mounting. Examples of bearing assemblies include a pivot bearing assembly used in a variable pitch mechanism, a bearing assembly used in a twisted wing mechanism, and/or some other type of bearing and/or bearing assembly. For example, the pitch of the fan blade 200 may be dynamically controlled via the variable pitch mechanism, which may comprise a pitch arm, pitch link, a torque plate, and a translating pitch cone.

Figure 4:
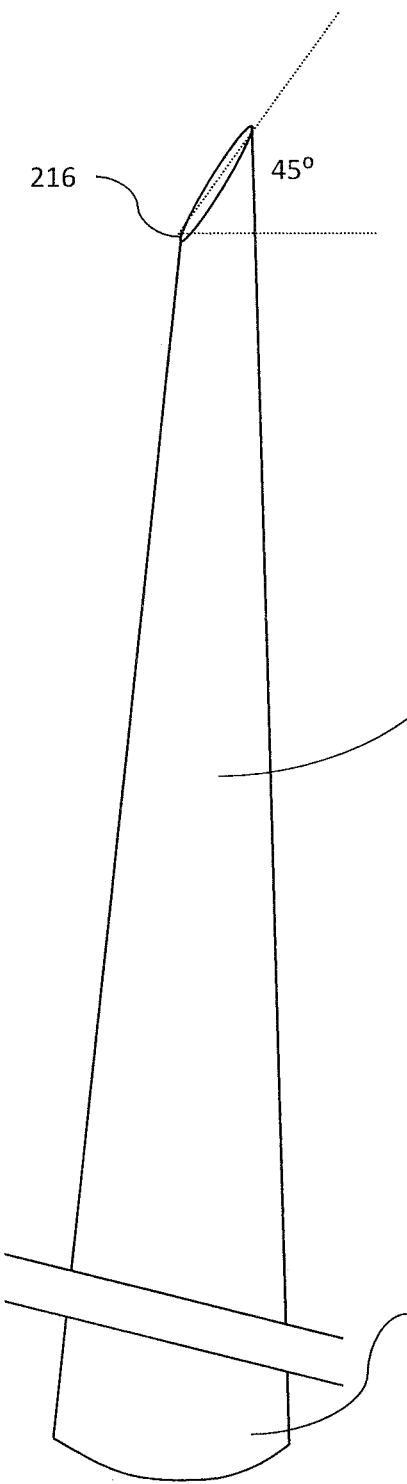
FIG. 4 illustrates a perspective view of a spar.

FIG. 4 illustrates an example spar 212. The spar 212 serves as a structural support for the fan blade 200. As shown in the figure, the spar 212 is generally frustoconical. That is, the spar 212 may have the shape of a cone with the narrow end, or tip, removed (for example, as illustrated, the tip may be cut at an angle relative to the base 214/collar 300). The spar 212 is widest at its base 214, and tapers to a tip 216 that has a smaller width, radius, and/or circumference. The tip 216 of the spar 212 is sanded down to an approximately 45-degree angle with respect to the base 214. In some examples, the angle of the tip 216 may be at a different angle between 35 and 75 degrees, such as an approximately 35-degree angle, an approximately 25-degree angle, an approximately 65-degree angle, or an approximately 75-degree angle, for example. The tip 216 of the spar 212 may be angled so that the skins of the blade 200 close around the spar 212. In other examples, the tip 216 may have no angle, and instead have a flat end that is generally parallel to the base 214. In some examples, a hollow shaft extends through all or some of the spar 212 (e.g., from the base 214 to, and through, the tip 216). The spar 212 may be formed of a conductive material, such as a composite material and/or carbon composite material, for example.

Figure 5:
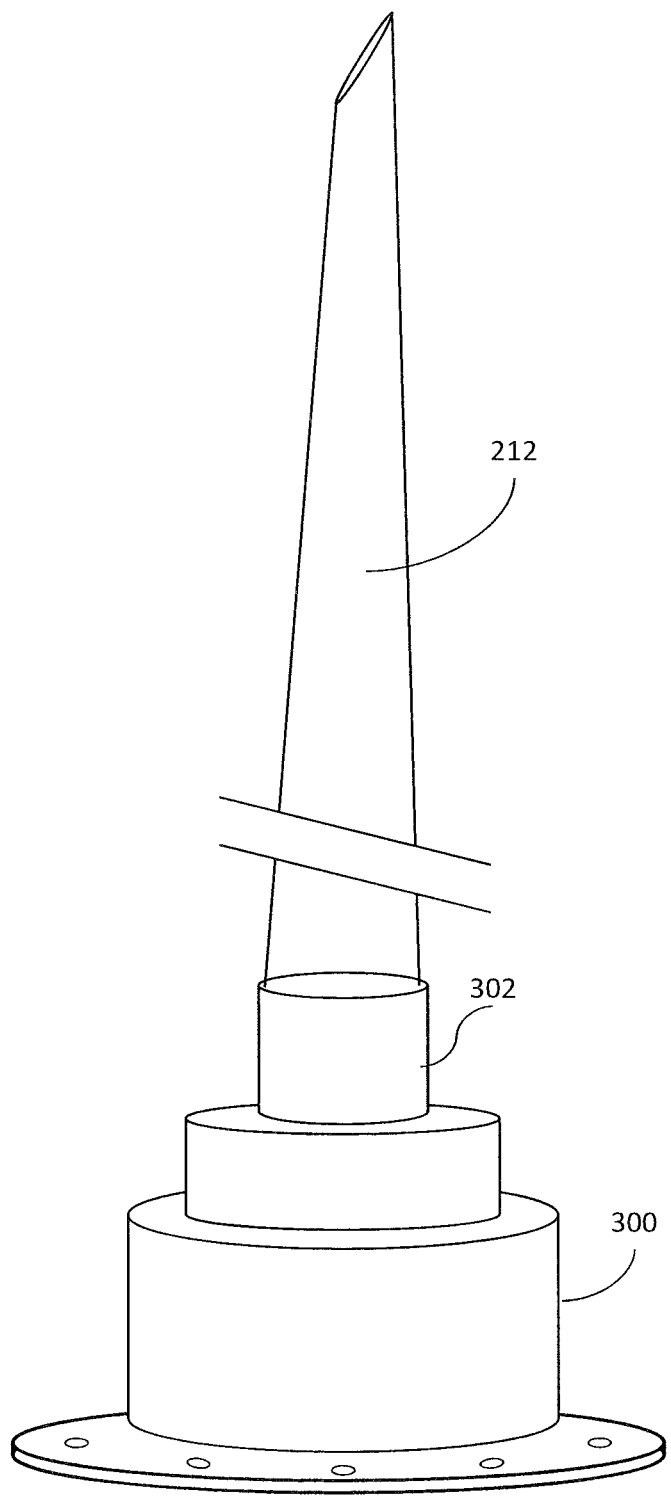
FIG. 5 illustrates the spar of FIG. 4 bonded to the collar of FIGS. 3a and 3b.

The base 214 of the spar 212 is sized such that it fits snugly within the bore 304 defined by the neck 302 of the collar 300. For example, the diameter of the spar 212 at its base 214 may be sized slightly smaller than the diameter of the bore 304. This may allow for a small gap between spar 212 and collar 300, which may be used to apply a bonding material between the base 214 of the spar 212 and the collar 300. The spar 212 may be coupled to the collar 300 using a bonding material, such as an adhesive, for example. The bonding material may be applied to a bonding area at, near, and/or around the base 214 of the spar 212. The bonding area may be approximately the length of the neck 302 of the collar 300. Bonding material may also be added to inside of the neck 302. The bonding material may include, for example, a conductive adhesive, such as a silver epoxy. In an example where the spar 212 is electrically conductive, the collar 300 is electrically conductive, and a conductive adhesive is used to bond the spar 212 to the collar 300, an electrically conductive pathway may be created that flows through the spar 212 and the collar 300. FIG. 5 illustrates the collar 300 bonded to the base 214 of the spar 212.

Figure 6:
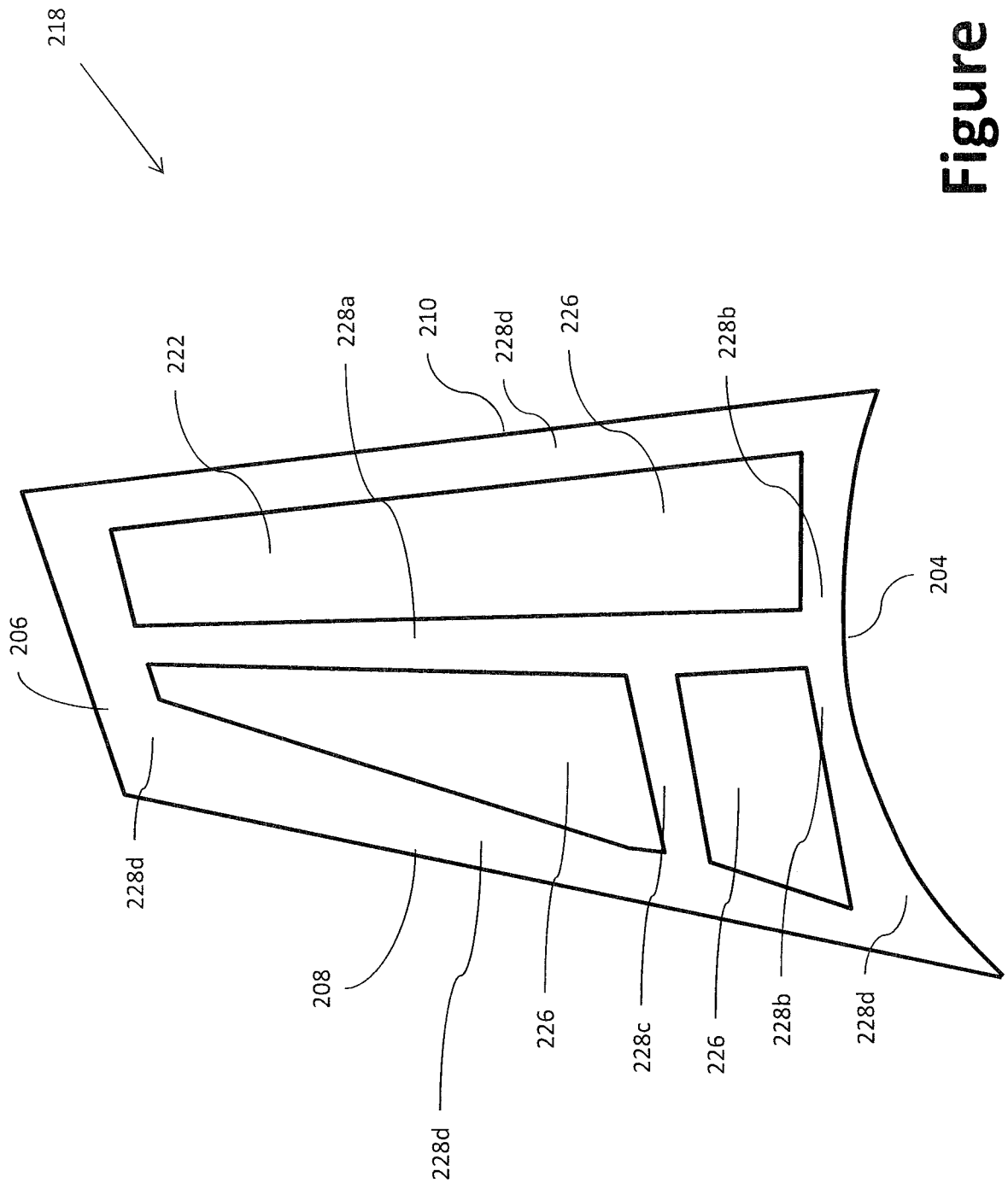
Figure 7:
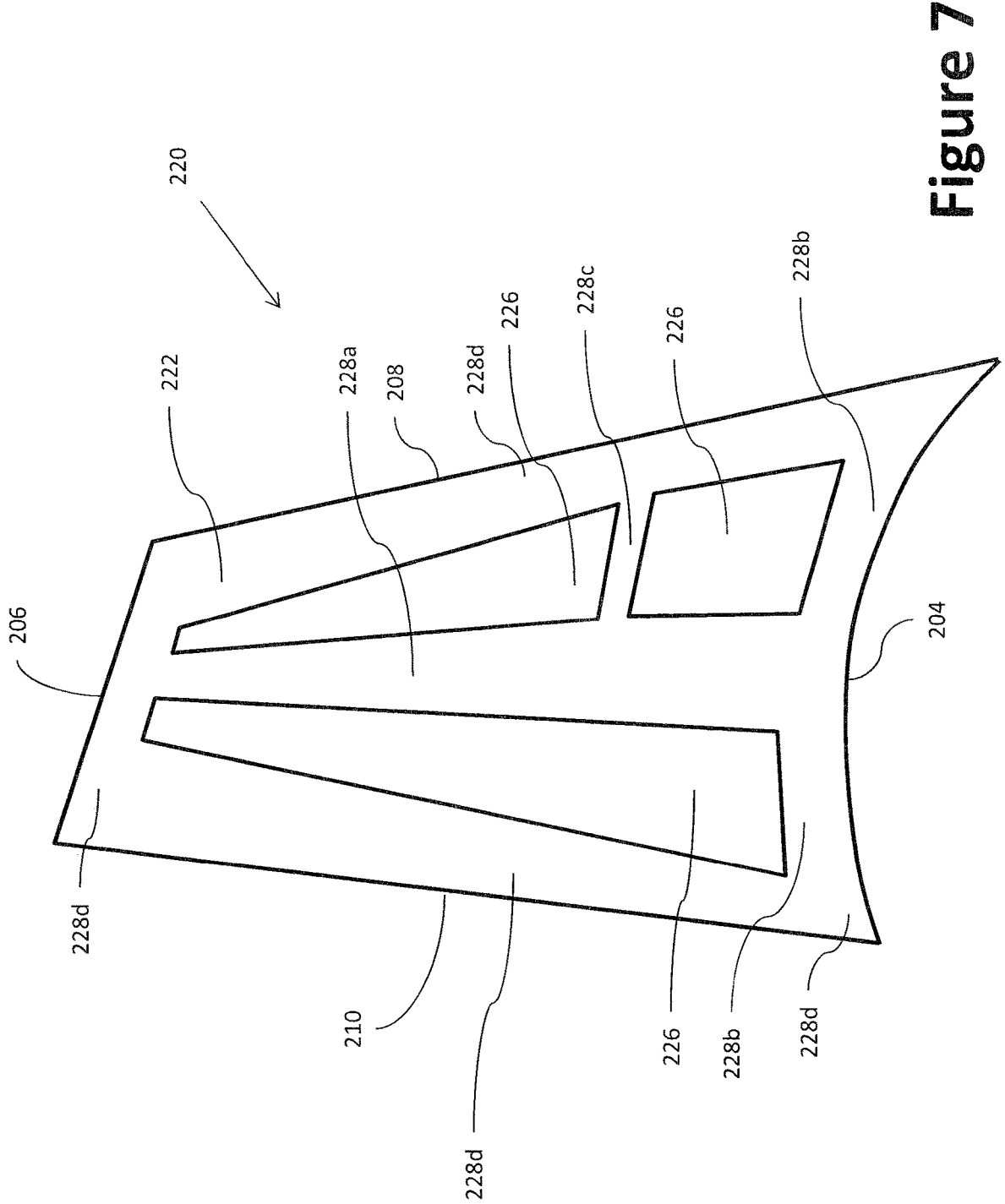

As shown in FIGS. 6 and 7, the fan blade 200 may be composed of a first portion (e.g., an upper portion 218) and a second portion (e.g., a lower portion 220). The upper portion 218 may comprise an upper airfoil of the fan blade 200, while the lower portion 220 may comprise a lower airfoil of the fan blade 200. Both portions have a blade root 204, a blade tip 206, a leading edge 208, and a trailing edge 210. Both portions also include an inner surface (defined by an inner skin 222 or inner lining) and an outer surface (defined by an outer skin 224). In an exemplary embodiment, the inner skin 222 is formed of an electrically conductive composite material. The outer skin may be formed of a similar composite material or a different material that is also electrically conductive. In certain aspects, a single skin material may be used to define the inner surfaces and the outer surfaces.

The inner skins 222 of the upper portion 218 and lower portion 220 include generally complementary raised portions 226 and recessed troughs 228. The raised portions 226 may comprise portions of core material applied to the inner skin 222 of the blade 200. The troughs 228 may comprise recessed portions of the core material, or portions of the inner skin 222 with no core material. A central trough 228a extends from the blade root 204 to the blade tip 206, bisecting the fan blade 200 and defining a space for the spar 212 support. In certain aspects, the central trough 228a may be sized and shaped to generally correspond to the size and shape of the spar 212, thereby providing a snug fit. A root rib trough 228b extends approximately perpendicular to the central trough 228a on both sides of the central trough 228a. A mid rib trough 228c also extends appropriately perpendicular to the central trough 228a. Although the mid rib trough 228c is only depicted on the trailing edge 210 side of the central trough 228a, in some examples the mid rib trough 228c may exist on the leading edge 208 side of the central trough 228a as well, or instead. A perimeter trough 228d extends around the perimeter of the fan blade 200, along the edge of the blade root 204, the edge of the blade tip 206, the leading edge 208, and the trailing edge 210. When the upper portion 218 and lower portion 220 of the fan blade 200 are connected, the raised portions 226 and troughs 228 generally align.

Figure 8:
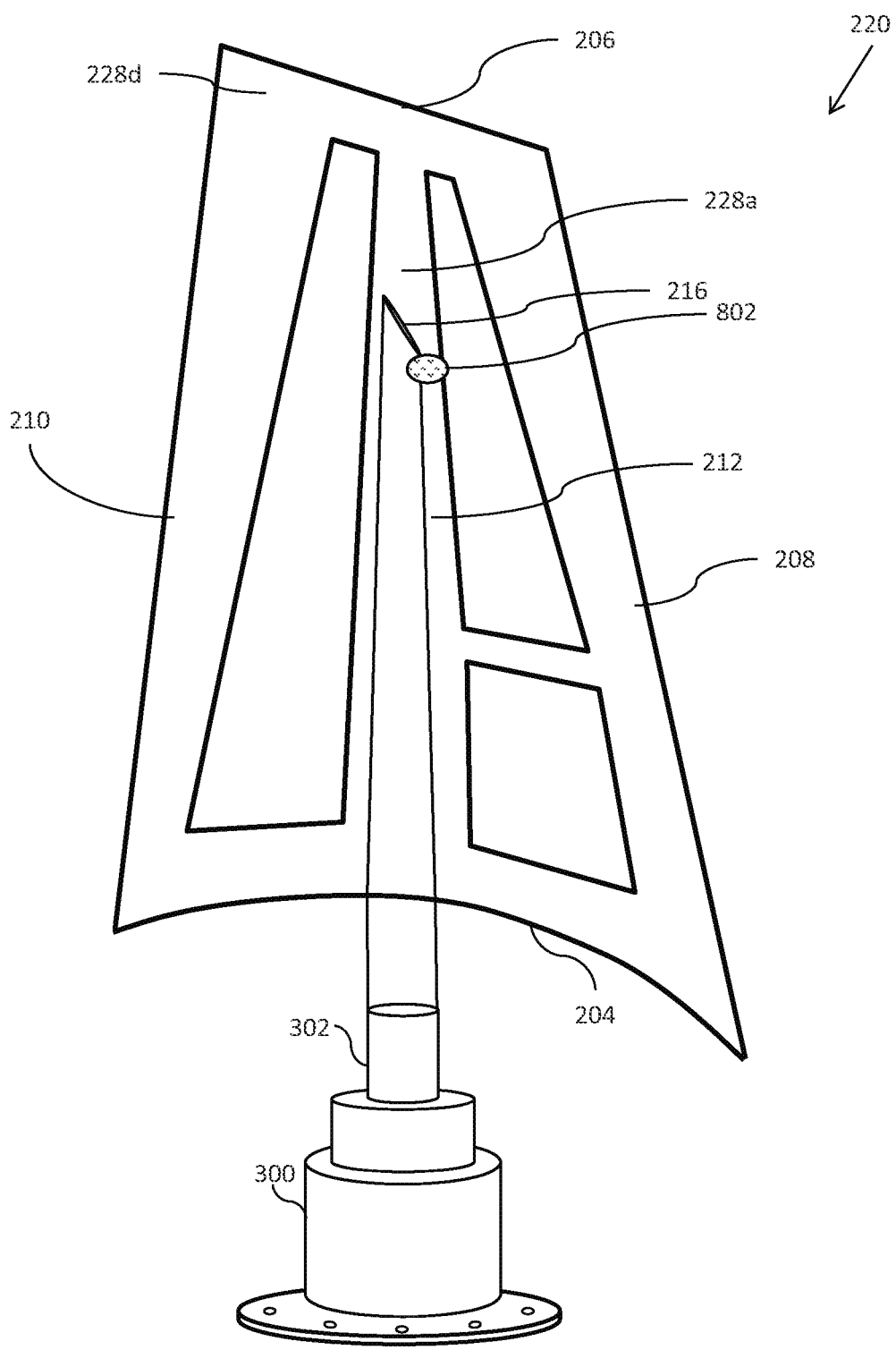
FIG. 8 illustrates the spar and collar of FIG. 5 with the lower portion of the fan blade of FIG. 7.

FIG. 8 shows the spar 212 positioned within the central trough 228a of the lower portion 220. The spar 212 extends from the blade root 204 towards the blade tip 206 within the central trough 228a. However, the tip 216 of the spar 212 may be sized to fall short of the blade tip 206 and/or the perimeter trough 228d, thereby allowing for installation of additional components. The central trough 228a and the spar 212 may each be coated with bonding material to bond the spar to the main body 202.

Figure 9A:
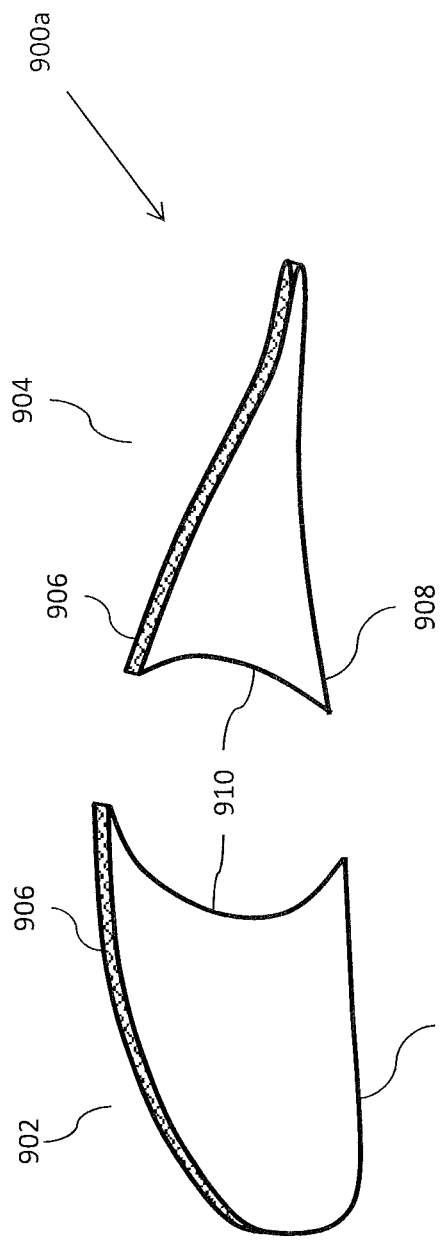
FIG. 9a illustrates a side plan view of a root rib.
Figure 9B:
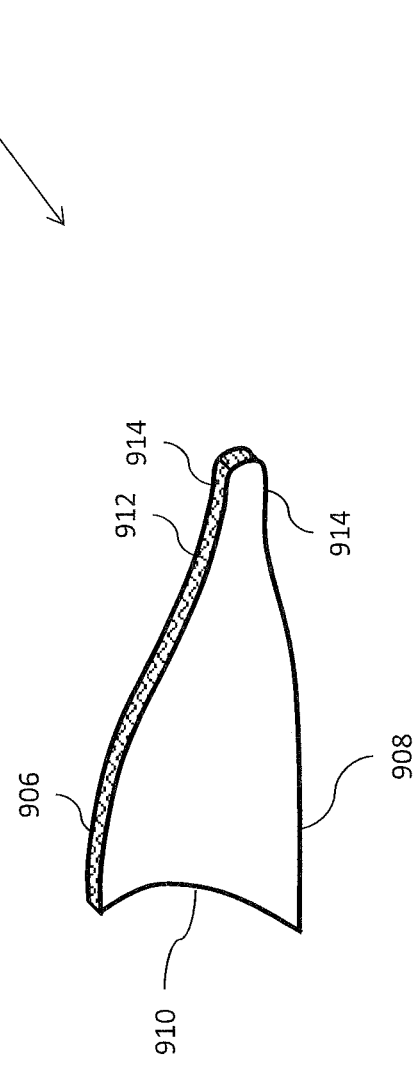
FIG. 9b illustrates a side plan view of a mid-rib.

Ribs are positioned within the rib troughs of the fan blade 200. FIGS. 9a and 9b illustrate a root rib 900a and mid rib 900b, respectively. The root rib 900a includes a front segment 902 and a rear segment 904 for positioning on either side of the spar 212. The mid rib 900b may include only one segment (illustrated as a rear segment). Both ribs include an upper edge 906, a lower edge 908, and a spar interface 910. Each of the root rib 900a and mid rib 900b segments may be fabricated using a core material 912 sandwiched between two rigid skins 914 that define the airfoil shape of the rib's perimeter. The core material 912 may be sized smaller than the two rigid skins 914 to define a channel to house bonding material between the two rigid skins 914. In some examples, solid laminate or bead stiffened laminate may be used instead of core material. In such an example, small structural members may be laid into the rib itself.

Figure 10:
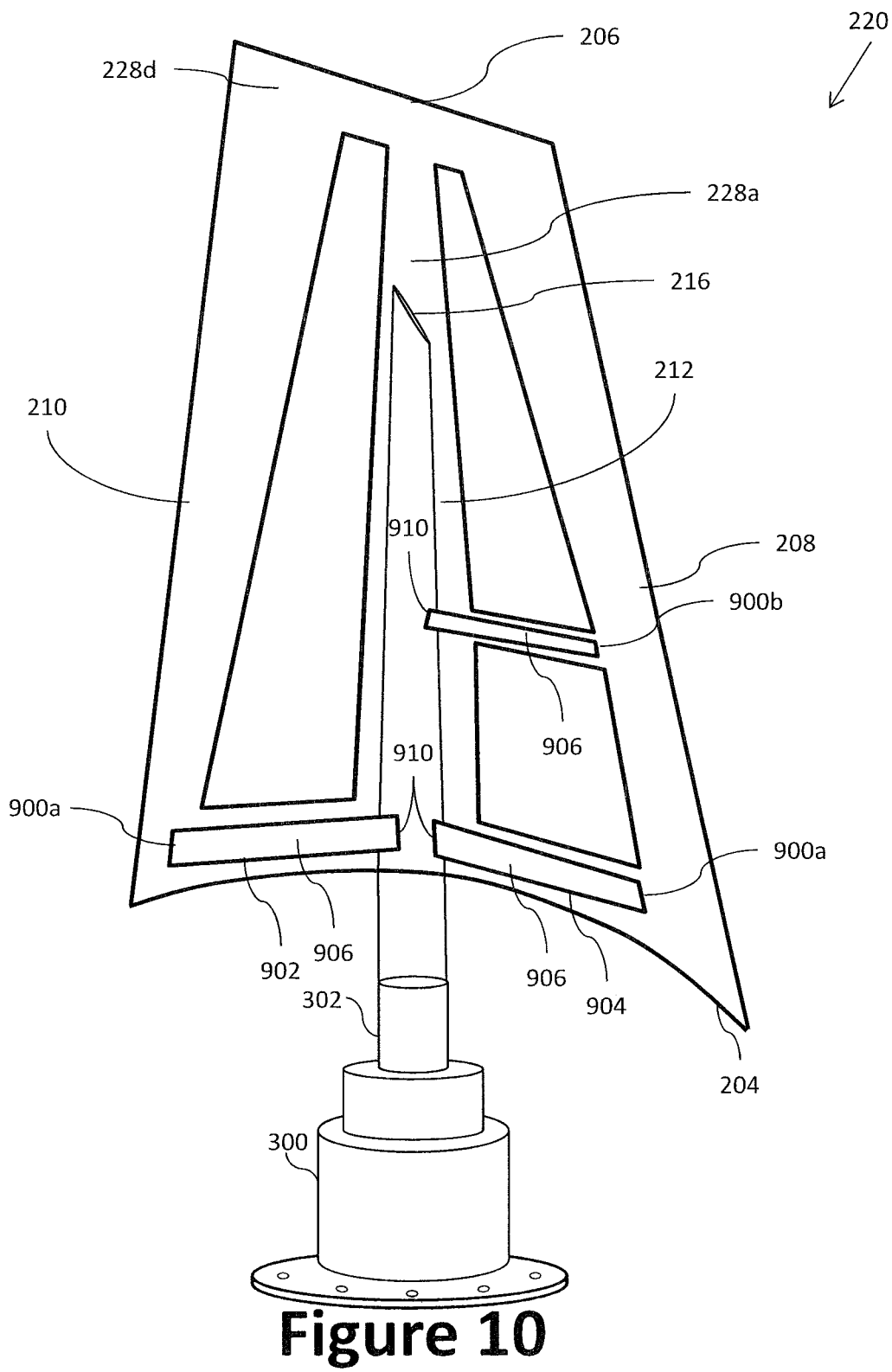
FIG. 10 illustrates the ribs of FIGS. 9a and 9b with the lower portion of the fan blade shown in FIG. 8.

As shown, in FIG. 10, the root rib 900a is positioned within the root rib trough 228b. The mid rib 900b is positioned within the mid rib trough 228c. The spar interface 910 of each rib 900 is bonded to the spar 212. The lower edge 908 of each rib 900 is bonded to the lower portion 220 of the fan blade 200, while the upper edge 906 is bonded to the upper portion 218 of the fan blade 200. To bond each rib 900 to the fan blade 200, bonding material may be placed in the root rib trough 228b and mid rib trough 228c of both the upper portion 218 and lower portion 220 of the fan blade 200. Alternatively, or additionally, bonding material may be placed along the upper edge 906, lower edge 908, and spar interface 910 of each rib (e.g., on the core material 912, between the two rigid skins 914). In certain aspects, the core material 912 of each rib 900 at the upper edge 906, lower edge 908, and/or spar interface 910 may be crushed back before bonding material is applied to define the channel between the two rigid skins 914. The ribs 900 help to both support the fan blade 200 and bond the upper portion 218 and lower portion 220 together.

The spar 212, root rib 900a, and mid rib 900b may be bonded to the lower portion 220 using a bonding material. In some examples, the adhesive may be an electrically conductive adhesive. Bonding material may be applied on both the lower portion 220 of the fan blade 200, in the appropriate troughs 228, and on the spar 212, root rib 900a and mid rib 900b themselves. Bonding material may be applied all around the spar 212 such that the spar 212 will also bond to the upper portion 218 of the fan blade 200. Bonding material may also be applied to the spar interface 910, the upper edge 906, and lower edge 908 of the root rib 900a and mid rib 900b, so that they will bond to the upper portion 218 of the fan blade 200 when the upper portion 218 and lower portion 220 are coupled together. Bonding material may further be applied to areas of the upper portion 218 and lower portion 220 substantially adjacent and/or along the leading edge 208 and/or trailing edge 210.

Figure 11:
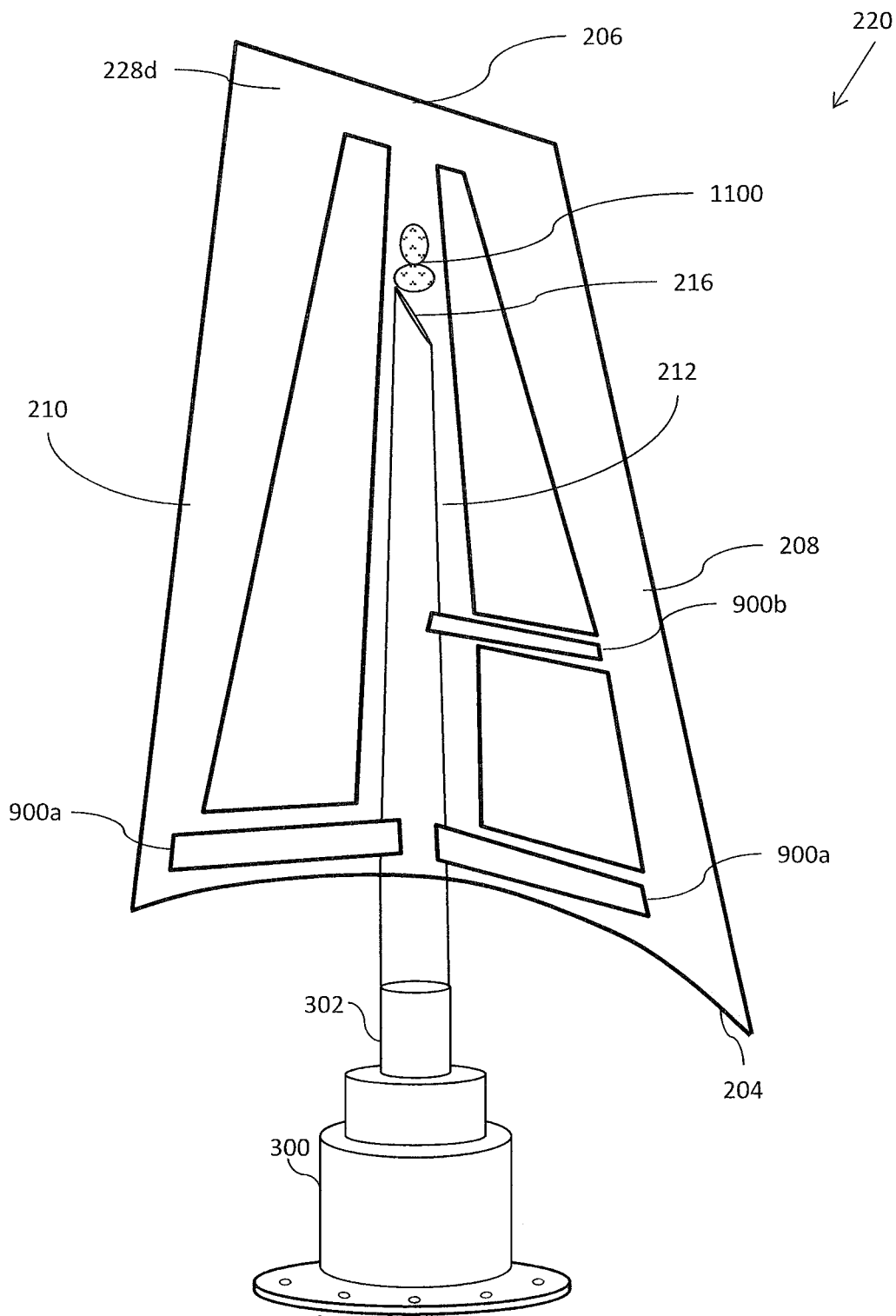
FIG. 11 illustrates the fan blade of FIG. 10 with a conductive connector.

As shown in FIG. 8, the spar 212 extends from the blade root 204 of the fan blade 200 towards the blade tip 206 of the fan blade 200. However, the spar 212 terminates at its blade tip 206 before reaching the blade tip 206 of the blade fan blade 200. As shown in FIG. 11, an electrically conductive connector 1100 is positioned in the central trough 228a over lapping with the tip 216 of the spar 212. The conductive connector 1100 may be a conductive silver epoxy, for example. When the upper portion 218 and lower portion 220 of the fan blade 200 are coupled together, the conductive connector 1100 serves as an additional bonding material to connect the fan blade 200 together. The conductive connector 1100 further electrically connects the upper portion 218 and lower portion 220 of the blade. In an example where the inner skin 222 of the fan blade 200 is electrically conductive, the electrically conductive connector 1100 provides an electrical pathway for static dissipation from any part of the fan blade 200 back to a ground (e.g., the aircrafts electrical ground via the collar 300).

Figure 12:
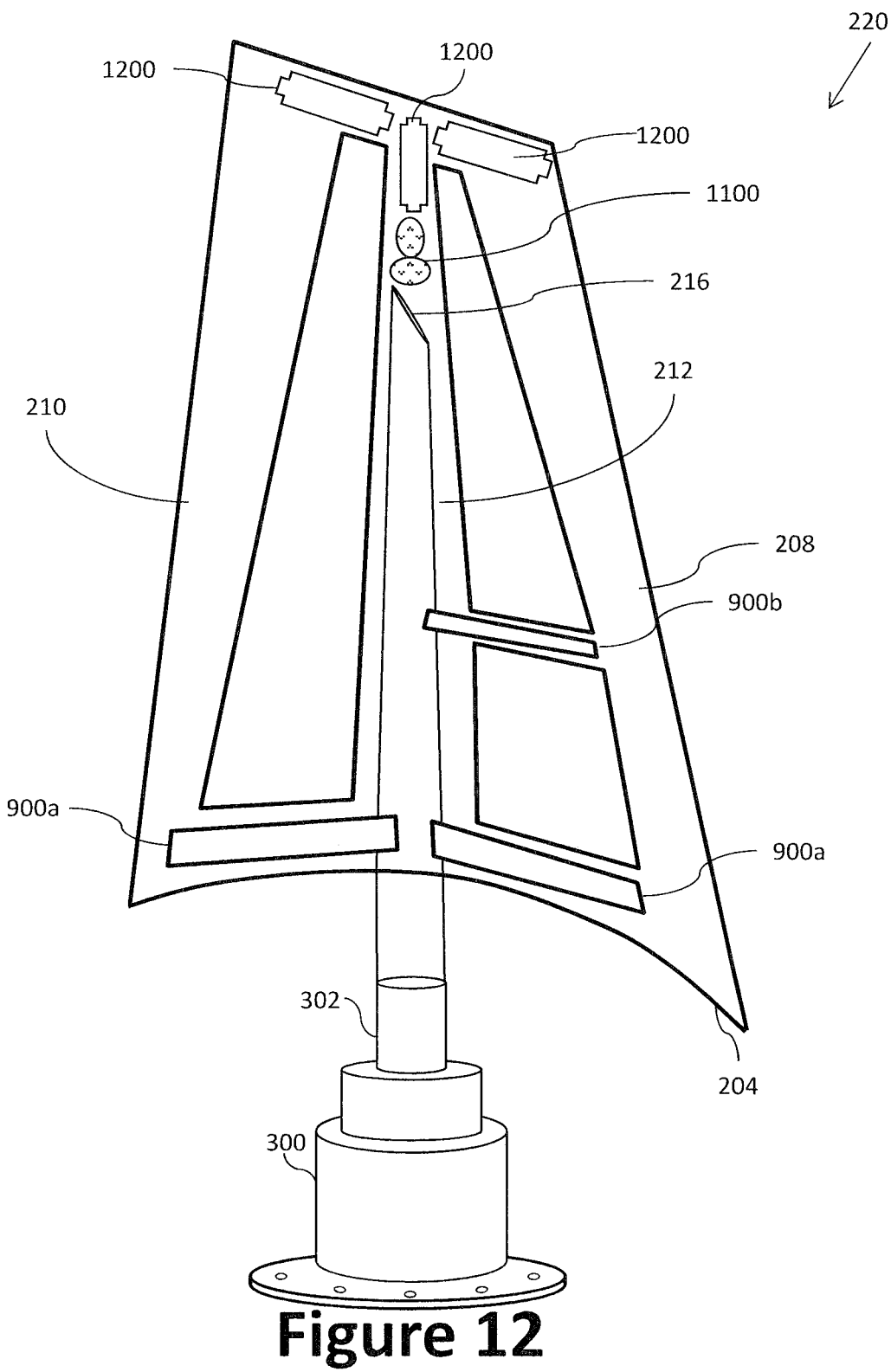
FIG. 12 illustrates the fan blade of FIG. 11 with structural adhesive.

As shown in FIG. 12, a structural adhesive 1200 is positioned within the central trough 228a, adjacent to the conductive connector 1100. In an exemplary embodiment, the structural adhesive 1200 is applied from the conductive connector 1100 to a point at or substantially near to the blade tip 206 of the fan blade 200. The structural adhesive 1200 is also applied along the edge of the blade tip 206, in the perimeter trough 228d. The structural adhesive 1200 acts as a central support, similar to the spar 212, both in the center of the fan blade 200 and in the perimeter trough 228d near the blade tip 206. The structural adhesive 1200 also helps to bond the upper portion 218 and lower portion 220 of the fan blade 200 together. While not illustrated, the structural adhesive may be placed elsewhere in the fan blade 200, such as along the perimeter of the main body 202. In some examples, the structural adhesive 1200 may be mixed with a thickening agent, such as glass microspheres, to lighten and provide structure to the adhesive 1200 before the adhesive 1200 is applied to the fan blade 200. The thickened structural adhesive 1200 serves as an adhesive support that can act as a spar tip extension, and the thickening agent assures the structural adhesive 1200 maintains its shape as the blade 200 is assembled.

Figure 13:
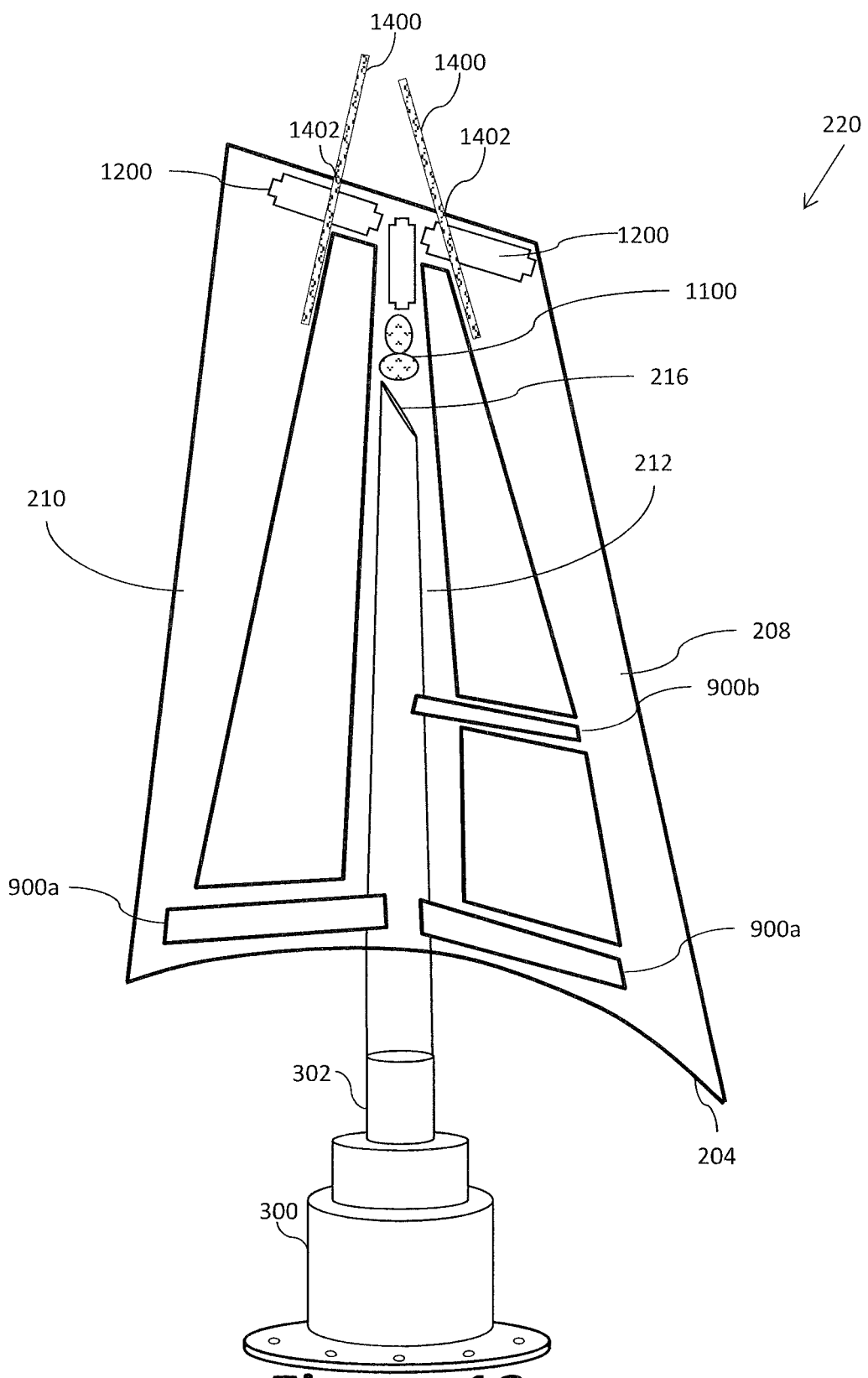
FIG. 13 illustrates the fan blade of FIG. 12, with pins in the structural adhesive.

As shown in FIG. 14, apertures 1402 are formed in the blade tip 206 of the fan blade 200, where FIG. 13 shows one example method of producing the apertures 1402 using removable pins 1400. In the example of FIG. 13, pins 1400 are placed through the structural adhesive 1200 near the blade tip 206 of the fan blade 200 before the upper portion 218 and lower portion 220 of the fan blade 200 are sandwiched and bonded together. The pins 1400 may be coated with a non-stick release agent to ease removal thereof. The pins 1400 may be aligned with the perimeter trough 228*d* to define fluid passageways from the apertures 1402, through the fan blade 200, and into the exterior environment. As the perimeter trough 228*d* extends around the entire perimeter of the fan blade 200, the fluid passageways extend from the blade tip 206 of the fan blade 200 all the way to the blade root 204 of the fan blade 200, and from the leading edge 208 to the trailing edge 210.

The fluid passageways provide a route for air to flow, so that air that enters the fan blade 200 through the blade root 204 can flow through the fluid passages, and out through the apertures 1402 in the blade tip 206, rather than becoming trapped in the fan blade 200, thereby reducing structural damage that may result due to fluid trapped in the blade. Trapped air can create large centrifugal pressure forces on the interior of the fan blade 200 that lead to structural deformation and/or failure. The apertures 1402 and resultant fluid passageways help to alleviate these forces to prevent and/or reduce structural deformations or failures that may result due to air trapped in the blade. In some examples, the passageways may be fluid passageways, allowing any fluid (e.g., air, water, etc.) to flow through the passageways and out of the apertures 1402. In examples where the fan blade 200 may be used in a ducted fan, the apertures 1402 and passageways may also provide buffer air out the tip of the blade that may be effective in closing the tip gap between the fan blade 200 and the wall of a duct.

Figure 15A:
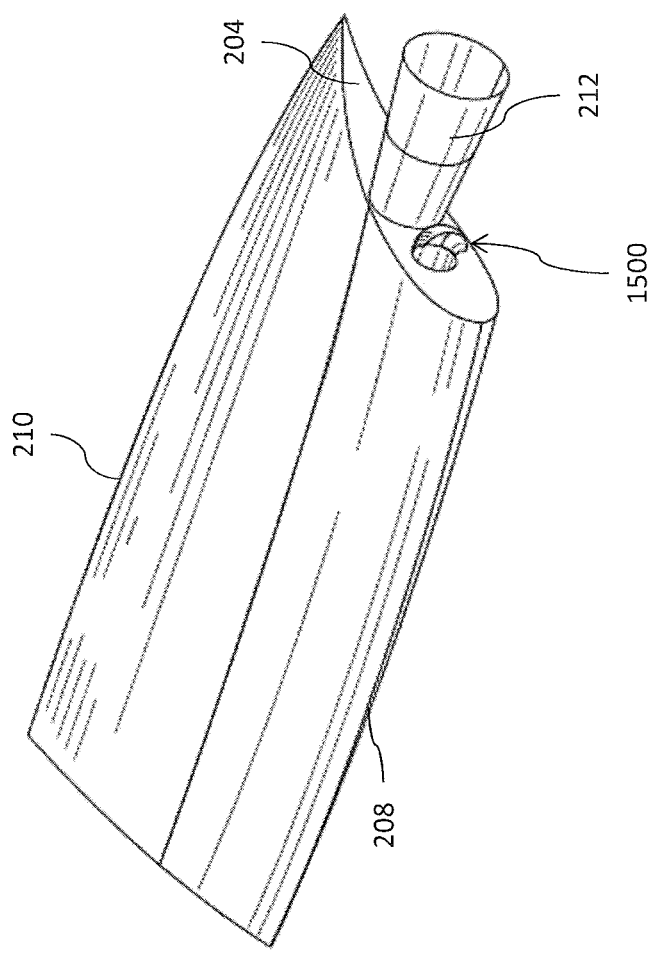
FIGS. 15a through 15c illustrate a flow guide of a fan blade.
Figure 15B:
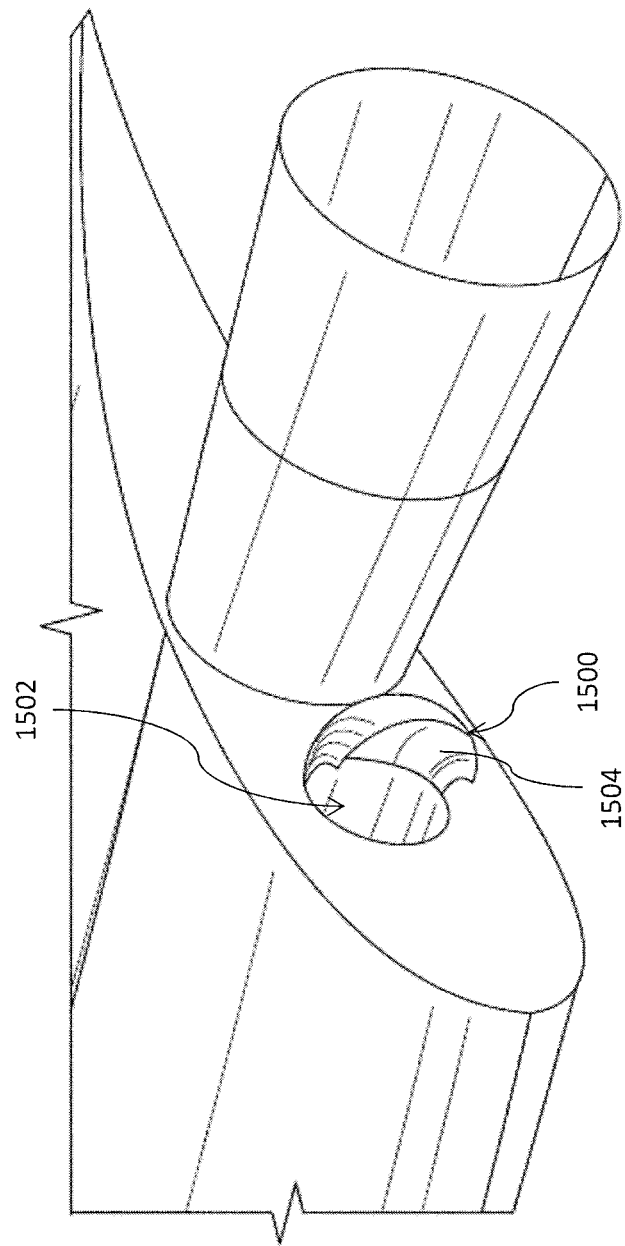
Figure 15C:
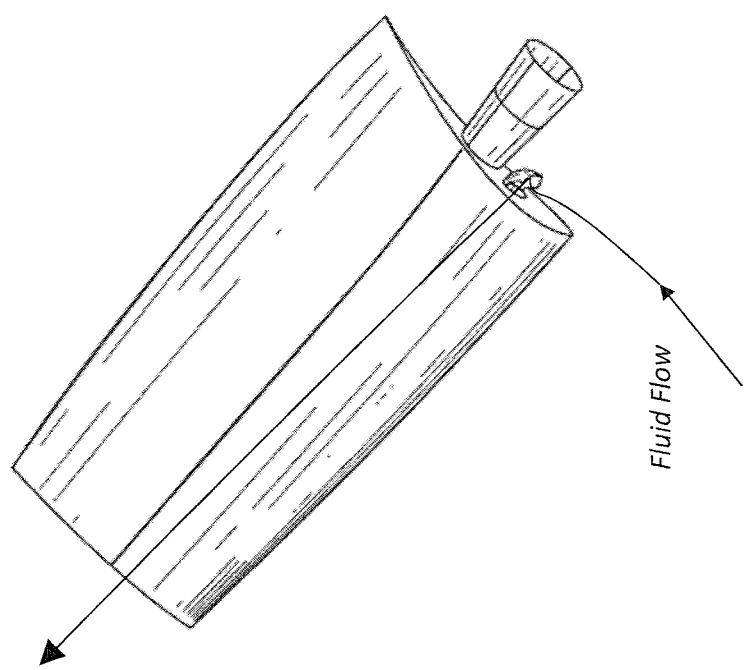

In some examples, flow guides 1500 may be used to funnel (and/or force, guide, direct, etc.) additional air through the fluid passageways to further increase the effects of air out the blade tip 206 in effectively reducing the fan blades tip gap in the duct. As shown in FIGS. 15*a* through 15*c*, a flow guide 1500 may be attached to the fan blade 200 at or near the blade root 204. In alternative examples, the flow guide 1500 may be attached to the spar 212. The flow guide 1500 may be curved and/or bent into a scoop configuration, so as to more efficiently direct air through the fluid passageways. A bowl 1504 of the flow guide 1500 may be positioned facing a leading edge 208 of the fan blade 200. In alternative examples, the bowl 1504 of the flow guide 1500 may be positioned facing the trailing edge 210, the spar 212, or the upper airfoil or lower airfoil of the fan blade 200. The flow guide 1500 may be positioned adjacent an aperture 1502. The aperture 1502 may be in fluid communication with the apertures 1402, such that fluid passageways extend from the apertures 1402 to the aperture 1502. FIG. 15*c* illustrates how the flow guide 1500 may guide fluid into the aperture 1502, through the fan blade 200 fluid passageways, and out through the apertures 1402. While only one fluid guide 1500 and one aperture 1502 is shown in the example figures, there may be a plurality of fluid guides 1500 and apertures 1502 in alternative examples. In some examples, there may be multiple fluid guides 1500 and only one aperture 1502, while, in other examples, there may be one fluid guide 1500 for multiple apertures 1502.

In operation, the fan blade 200 has an increased structural integrity due to the fluid passageways out of the fan blade 200. The fan blade 200 may also have a substantial weight reduction as compared to other fan blades due to the use of the structural adhesive 1200 as a support. The integration of an electrically conductive connector 1100 provides a means for dissipating and/or discharging static electricity that may build up during operation. Static electricity can be dangerous, especially in environments having combustible material. The disclosed example fan blade 200 reduces the danger surrounding static electricity by providing a pathway for static dissipation and/or discharge from any part of the fan blade 200 back to an electrical ground. The electrical path may flow from the skins through the conductive connector 1100 and into the spar 212. From the spar 212, the electrical path may flow into the collar 300 via the electrically conductive bonding material 802 connecting the spar 212 to the collar 300, which is illustrated in FIG. 8. The collar 300 may be comprised of electrically conductive material, and may be coupled to a bearing assembly (not shown) comprised of an electrically conductive material (e.g. metal). A jumper wire or other conductive connector may span inner and outer races of the bearing to continue the electrical path. The bearing may be coupled via fasteners to the hub 106 and shaft 104 back through an aircraft structure (not shown) which may be used as a ground reference. A conductive Teflon seal may be utilized in the fan assembly (i.e., among the hub 106, the shaft 104, and the collar 300) such that the electrical path may flow to ground.

In certain aspects, a method of enhancing integrity of a fan blade 200 having a blade body 202 may comprise the steps of: providing a first portion (e.g., the upper portion 218) of the blade body 202; providing a second portion (e.g., the lower portion 220) of the blade body 202; providing a spar 212 between the first portion and the second portion, wherein the spar 212 is coated with a bonding material; and bonding the first portion to the second portion with the spar 212 positioned between the first portion and the second portion, wherein the bonding material bonds the first portion to the second portion to define the blade body 202. An adhesive support, such as the thickened structural adhesive 1200, may be provided between the first portion and the second portion, wherein the adhesive support bonds the first portion to the second portion. A conductive bonding material may be provided between the first portion and the second portion such that the conductive bonding material bonds the first portion to the second portion and provides an electrical pathway for static dissipation (e.g., to ground). A fluid passageway (e.g., perimeter trough 228*d* or another trough) can be formed between the first portion and the second portion to allow fluid (air, water, etc.) to flow out of the blade body 202. A fluid guide 1500 can be used to guide fluid through the fluid passageway.

Figure 16A:
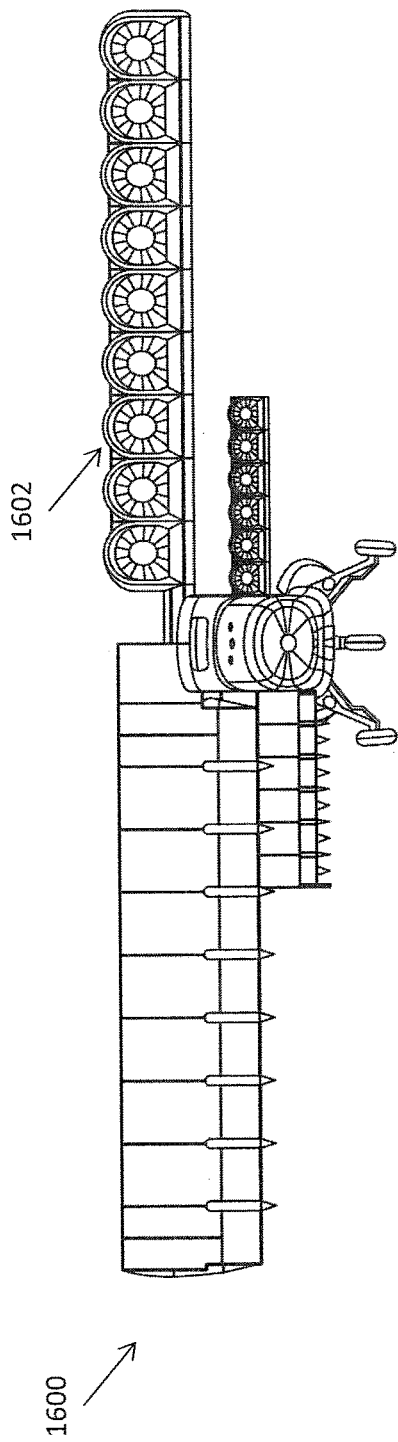
FIGS. 16a and 16b illustrate the fan blade used in a ducted fan of an aircraft.
Figure 16B:
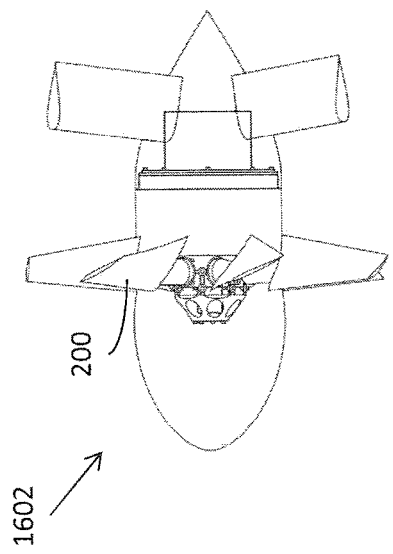

As previously mentioned, the fan blade 200 could be used in many applications. The fan blade 200 may be used as part of an aircraft propulsion system, such as in a propeller, a ducted fan propulsion system, a VTOL propulsion system, a turbofan, a propfan, etc. Alternatively, or additionally, the fan may be used in an industrial blower, and/or a heating, ventilation, and air conditioning (HVAC) system. FIGS. 16*a* and 16*b* show the fan blade 200 as part of a ducted fan 1602 in a VTOL propulsion system of a VTOL aircraft 1600.

While examples disclosed with reference to the figures refer to portions of the fan as "upper," "lower," "inner,"

"outer," "leading edge," and/or "trailing edge," these labels are used for convenience and ease of understanding.

The above-cited patents and patent publications are hereby incorporated by reference in their entirety. It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A fan blade comprising:
   a blade body spanning from a blade root to a blade tip in a longitudinal direction, and spanning from a leading edge to a trailing edge in a lateral direction, the blade body comprising an upper portion and a lower portion each comprising an inner skin, wherein the upper portion and the lower portion are separate structures that are bonded together via a conductive bonding material such that the upper portion and the lower portion are electrically connected to provide an electrical pathway for static dissipation,
   wherein the inner skin of the upper portion includes first raised portions and first recessed troughs and the inner skin of the lower portion includes second raised portions and second recessed troughs;
      a fluid passageway formed within the blade body to allow fluid to flow out of the blade body, wherein the fluid passageway extends from an inlet on the blade root that is positioned between the leading edge and the trailing edge to the blade tip, wherein the blade body comprises:
         a central trough formed by an alignment of the first raised portions of the upper portion and the second raised portions of the lower portion and extending from the blade root to the blade tip to define a space for a spar support, and
         a perimeter trough formed by alignment of the first raised portions of the upper portion and the second raised portions of the lower portion and extending around an entire perimeter of the fan blade to define the fluid passageway;
      a spar extending through the central trough between the upper and lower portions from the blade root towards the blade tip and terminating at a termination point prior to the blade tip; and
      a rib between the upper portion and the lower portion and bonded to the spar, and wherein the rib is configured to at least partially bond the upper and lower portions together.

2. The fan blade of claim 1, further comprising a scoop at the inlet to urge fluid through the fluid passageway.

3. The fan blade of claim 1, wherein the blade tip includes a n aperture and the fan blade is configured to direct fluid from the fluid passageway through the aperture.

4. The fan blade of claim 1, wherein the upper portion is further bonded to the lower portion using a structural adhesive.

5. The fan blade of claim 4, wherein the fluid passageway extends through the structural adhesive.

6. The fan blade of claim 1, wherein the fan blade further includes a fluid guide to guide fluid through the fluid passageway.

7. A fan for an aircraft comprising:
   a bearing assembly;
   a collar attached to the bearing assembly, wherein the collar includes a tapering neck defining a bore; and
   a fan blade attached to the collar via a spar,
      wherein the fan blade includes a blade body and the spar extends from the collar, and the fan blade further comprising a conductive bonding material between and in contact with each of the blade body and the spar,
      wherein the blade body comprises a central trough extending from a blade root to a blade tip to define a space to receive the spar, and a perimeter trough extending around an entire perimeter of the fan blade to define a fluid passageway, and
      wherein the spar is bonded to the collar with a bonding material, wherein the spar is positioned within the bore and bonded to the tapering neck,
      wherein the blade body comprises an upper portion and a lower portion, wherein the upper portion and the lower portion are separate structures that are bonded together via the conductive bonding material such that the upper portion and the lower portion are electrically connected to provide an electrical pathway for static dissipation, and
      wherein the fan blade includes a rib between the upper and lower portion and bonded to the spar.

8. The fan of claim 7, wherein the tapering neck defines a circular cross section.

9. The fan of claim 7, wherein the collar includes a pivot bearing configured to pivot about a spar axis.

10. A fan blade comprising:
    an upper portion spanning from a blade root to a blade tip, wherein the upper portion defines a first outer surface and a first inner surface, wherein the first inner surface comprises a first plurality of troughs;
    a lower portion spanning from the blade root to the blade tip, wherein the lower portion defines a second outer surface and a second inner surface, wherein the second inner surface comprises a second plurality of troughs,
       wherein the upper and lower portions merge to define a blade body having a leading edge and a trailing edge, wherein the upper portion and the lower portion are separate structures bonded together via a conductive bonding material such that the upper portion and the lower portion are electrically connected to provide an electrical pathway for static dissipation, and
       wherein the blade body comprises:
          a central trough extending from the blade root to the blade tip to define a space fora spar support, and
          a perimeter trough extending around an entire perimeter of the fan blade to define a fluid passageway,
    a spar extending through the central trough between the upper and lower portions from the blade root towards the blade tip and terminating at a termination point prior to the blade tip,
       wherein the spar comprises an electrically conductive connector at the termination point, wherein the spar is positioned approximately equidistant from the leading edge and trailing edge, and wherein the spar is coated in the conductive bonding material to bond the upper portion to the lower portion;

an adhesive support positioned between the upper portion and the lower portion and configured to at least partially bond the upper portion to the lower portion; and a rib between the upper portion and the lower portion configured to at least partially bond the upper portion to the lower portion, and wherein the rib is bonded to the spar.

11. The fan blade of claim 10, wherein the rib comprises an upper edge and a lower edge, and wherein bonding material is placed on the upper edge and the lower edge.

12. The fan blade of claim 11, wherein the spar is positioned in the central trough.

13. The fan blade of claim 10, wherein the adhesive support extends along the blade tip from the leading edge to the trailing edge.

14. The fan blade of claim 10, wherein the adhesive support includes an aperture, and wherein the aperture is aligned with a portion of the perimeter trough, thereby defining a passage for fluid to flow to provide a path for trapped air to exit the fan blade.

15. The fan blade of claim 10, wherein the adhesive support comprises a mix of an adhesive and a thickening agent.

16. The fan blade of claim 10, wherein the electrically conductive connector is configured to electrically connect the upper and lower portions to provide an electrical pathway for static dissipation.

17. The fan blade of claim 16, wherein the electrically conductive connector is positioned between the spar and the adhesive support.

18. The fan blade of claim 10, wherein the first and second outer surfaces and the first and second inner surfaces are electrically conductive.

19. A method of enhancing integrity of a fan blade having a blade body, the method comprising the steps of:

providing a first portion of the blade body;

providing a second portion of the blade body, wherein the first portion and the second portion are separate structures, wherein the first portion and the second portion define a central trough extending from a blade root to a blade tip, and a perimeter trough extending around an entire perimeter of the fan blade to define a fluid passageway;

providing a spar within the central trough between the first portion and the second portion, wherein the spar is coated with a first bonding material, wherein at least a portion of the first bonding material at one end is a conductive bonding material;

providing a rib between the first portion and the second portion, wherein the rib is coated with a second bonding material;

bonding the rib to the spar; and bonding the first portion to the second portion with the spar and the rib positioned between the first portion and the second portion, wherein the first and second bonding materials bond the first portion to the second portion to define the blade body, and wherein at least one of the first and second bonding materials is the conductive bonding material such that the first portion and the second portion are electrically connected to provide an electrical pathway for static dissipation.

20. The method of claim 19, further comprising the step of providing an adhesive support between the first portion and the second portion, wherein the adhesive support bonds the first portion to the second portion.

21. The method of claim 19, further comprising the step of forming the fluid passageway between the first portion and the second portion to allow fluid to flow out of the blade body.

22. The method of claim 21, further comprising the step of providing a scoop to funnel air through the fluid passageway.

* * * * *